Figure 1:
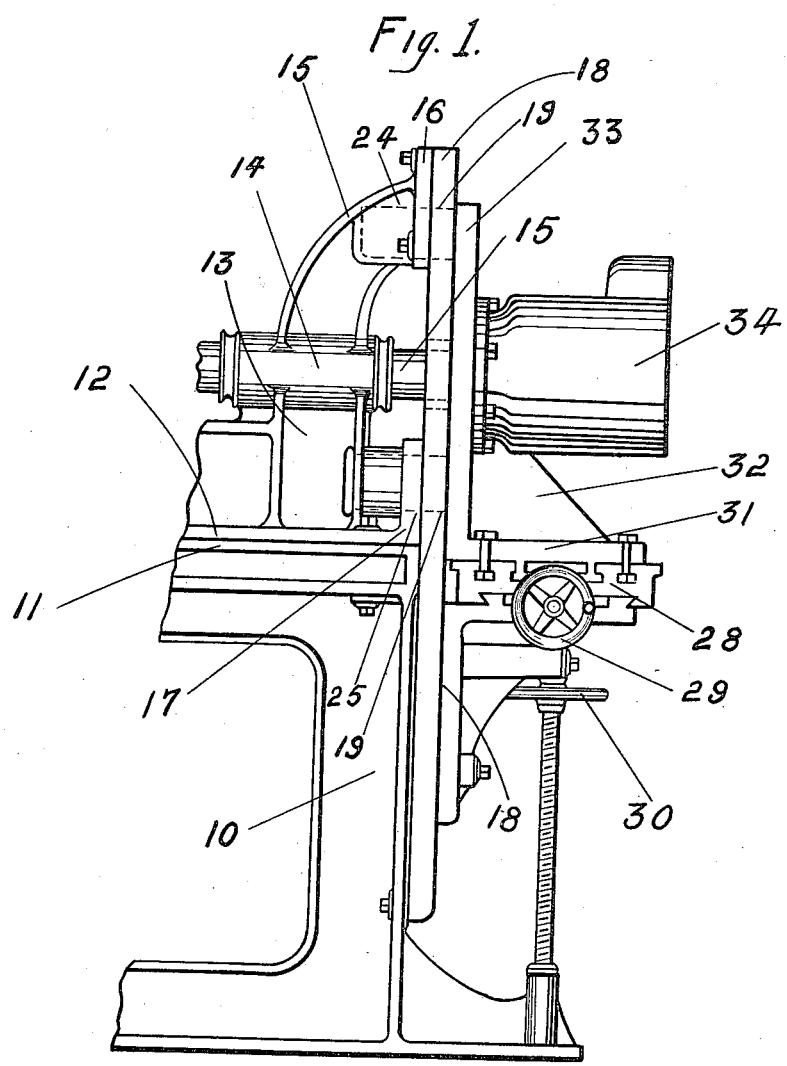

E. A. DE FOREST.
BORING MACHINE.
APPLICATION FILED MAR. 26, 1917.

1,278,607.

Patented Sept. 10, 1918.
2 SHEETS—SHEET 2.

Fig. 2.

Inventor
Edgar. A. De Forest
per F. A. Whiteley
Attorney

UNITED STATES PATENT OFFICE.

EDGAR A. DE FOREST, OF MINNEAPOLIS, MINNESOTA, ASSIGNOR TO MARVEL MACHINERY COMPANY, OF MINNEAPOLIS, MINNESOTA.

BORING-MACHINE.

1,278,607.  Specification of Letters Patent.  Patented Sept. 10, 1918.

Application filed March 26, 1917. Serial No. 157,335.

*To all whom it may concern:*

Be it known that I, EDGAR A. DE FOREST, a citizen of the United States, residing at Minneapolis, in the county of Hennepin and State of Minnesota, have invented certain new and useful Improvements in Boring-Machines, of which the following is a specification.

My invention relates to boring machines, and has for its object to provide a boring machine having a magnetic face plate for holding the work that is being operated upon from chattering or vibration while the tool is working on the same. It is a further object of my invention to provide means for holding work to be operated upon by a boring machine or internal milling cutter which does not involve the bolting of work to the face plate of the machine. It is a further object of my invention to provide a machine of the character described wherein no bolt holes or bolting means for securing work directly to the face plate will be required.

The full objects and advantages of my invention will appear in connection with the detailed description thereof, and are particularly pointed out in the claims.

In the drawings, illustrating the application of my invention in one form,—

Figure 1 is a partial side elevation of a boring machine showing my invention applied thereto, and work in position to be operated upon by the boring machine. Fig. 2 is a part sectional, elevation view, on an enlarged scale of some of the features shown in Fig. 1.

As illustrated and described, a base frame member 10 has a table 11 supporting an upper frame member 12 to which is secured a standard 13 having thereon a bearing member 14 through which the boring bar 15 extends. Extending upwardly and forwardly from bearing member 14 is a continuation 15 of standard 13 which is formed with a supporting plate 16. Securely bolted to frame 10, supporting plate 16 and to a second supporting plate 17 on upper base 12 is a face plate 18. This face plate 18 is provided with threaded apertures 19 in front of openings through supporting plates 16 and 17, indicated at 20, for face plate 16. Housings 21 and 22 are formed in conjunction with said supporting plates 16 and 17 which housings surround the openings 20. Threaded into the openings 19 in face plate 18 are the casings 23 of electro-magnets 24 and 25. These magnets may be of any approved form and have the pole pieces 26 thereof flush with the outer surface of the face plate 18. The magnets 24 and 25 are supplied with electric current from any available source, not shown. A work-holding table 28 is adjustable laterally by hand-wheel 29 and vertically by hand-wheel 30 in a well known manner, to the upper surface of which is adapted to be secured the base 31 of an L-piece 32 having a substantially vertical wall member 33 to which is bolted in the usual manner the cylinders or other articles 34 to be bored. The wall member 33 is provided with an enlarged opening 35 and the face plate 27 has a similar opening 36 through which the boring bar 15 extends so that the tool 37 carried by the boring bar may properly operate upon the inside of cylinder 34 when the same is secured to wall 33.

In operation, a cylinder or block of cylinders to be bored is secured to wall plate 33 so that the opening of the particular unit which is to be bored or interiorly milled is positioned substantially symmetrically over the opening 35. The L-piece 32 is then secured upon work-table 28 with the back wall 33 as near as possible in contact with face plate 27 and by means of work-table 28 the same is adjusted properly in reference to boring or milling tool 37. Electricity is then turned through magnets 24 and 25 with the result that the back wall 33 is magnetically drawn against face plate 18 with a degree of force proportioned to the size of the magnets and the force of the current passing through the same. This results in drawing the plates 33 and 18 together with an adhering contact which cannot be disturbed by the operation of the tool, so that the boring operation takes place without vibration or chattering and accurate and highly satisfactory work results.

I claim:

1. A boring machine comprising a boring bar, a work supporting table, a face plate through which said bar operates upon work supported on the table, and magnetic means in the face-plate for holding the work from movement relative thereto.

2. A boring machine comprising a boring bar, a work supporting table, a face plate having an enlarged aperture through which the boring bar operates upon work supported on the table, and magnetic means in said face plate on the two sides of said opening for holding the work from movement relative to the face plate while the same is being operated upon.

3. A boring machine comprising a boring bar, a work supporting table, a face plate having an opening through which the boring bar operates upon work supported upon the table, and electromagnets within and having their pole pieces in the plane of the surface of said face plate.

4. A boring machine comprising a boring bar, a work supporting table, a face plate having an opening through which the boring bar operates upon work supported upon the table, and electromagnets within and having their pole pieces in the plane of the surface of said face plate, one of said electromagnets being located below and the other above said opening.

5. A boring machine comprising a boring bar, a work supporting table, a face plate having a central opening through which said boring bar operates upon work supported by the table and having openings above and below said central opening, a frame supporting said face plate and having casing sections extending backwardly from said last named openings, and electromagnets within said casings and openings having their pole pieces extending to the plane of the outer surface of the face plate and operative to hold work from movement relative to said face plate while said work is being operated upon by the boring bar.

6. A boring machine comprising a boring bar, a work supporting table, a work holding member adapted to be removably secured to the table and having an upright member to which the work is secured, provided with an opening through which the boring bar operates upon the work, a face plate having a similar opening for the boring bar, with its surface in close proximity to said upright, and magnetic means in said face plate for holding said upright and the work held thereby against movement relative to said face plate.

In testimony whereof I affix my signature.

EDGAR A. DE FOREST.

Copies of this patent may be obtained for five cents each, by addressing the "Commissioner of Patents, Washington, D. C."